United States Patent [19]

Yasuda et al.

[11] Patent Number: 5,062,132
[45] Date of Patent: Oct. 29, 1991

[54] TELEPHONE APPARATUS PROVIDING FOR AUTOMATIC TRANSFER OF STORED DATA BETWEEN HANDSETS

[75] Inventors: Hiroshi Yasuda, Kanagawa; Noboru Someno, Saitama, both of Japan

[73] Assignee: Sony Corporation, Tokyo, Japan

[21] Appl. No.: 457,931

[22] Filed: Dec. 27, 1989

[30] Foreign Application Priority Data

Dec. 27, 1988 [JP] Japan .................................. 63-330139

[51] Int. Cl.⁵ ...................... H04M 1/27; H04M 11/00
[52] U.S. Cl. ......................................... 379/61; 379/62; 379/63; 379/355
[58] Field of Search ............................. 379/58, 61–63, 379/354, 355

[56] References Cited

U.S. PATENT DOCUMENTS

| | | | |
|---|---|---|---|
| 3,689,703 | 9/1972 | Allen et al. | 379/246 |
| 4,122,304 | 10/1978 | Mallien | 379/63 |
| 4,639,550 | 1/1987 | Yamagawa et al. | 379/62 |
| 4,752,949 | 6/1988 | Steinbeck et al. | 379/63 |
| 4,805,211 | 2/1989 | Brennon et al. | 379/355 |
| 4,811,377 | 3/1989 | Krolopp et al. | 379/62 |

FOREIGN PATENT DOCUMENTS

0310876 4/1989 European Pat. Off. .
0053552 3/1987 Japan .................................. 379/355

*Primary Examiner*—Jin F. Ng
*Assistant Examiner*—Dwayne D. Bost
*Attorney, Agent, or Firm*—Lewis H. Eslinger; Donald S. Dowden

[57] ABSTRACT

In a telephone system, when a predetermined key of a handset unit is operated data stored in a memory incorporated within the handset unit is transferred to a memory incorporated within another handset unit, so that data that was manually input for storage in the memory of the first handset unit can be copied to the memory of a second handset unit, to eliminate the requirement to manually input the same data into the second unit.

13 Claims, 3 Drawing Sheets

TELEPHONE APPARATUS PROVIDING FOR AUTOMATIC TRANSFER OF STORED DATA BETWEEN HANDSETS

BACKGROUND OF THE INVENTION

1. Field of the Invention

The present invention relates generally to telephone apparatus and, more particularly, to telephone apparatus such as a cordless telephone that is capable of multiple operational modes.

2. Description of the Background

Telephone systems capable of performing multiple functions and having different operational modes, such as a mobile telephone system, a cordless telephone, a so-called intelligent telephone, and the like are now widely used. When making an outgoing call, the telephone subscriber or user has to operate a number of pushbuttons or keys, for example, from 6 to 14 digits may have to be entered, which is very cumbersome for the user. To avoid this disadvantage, frequently this type of telephone is provided with an abbreviated dialing function and/or a so-called one-touch dialing function. In such abbreviated dialing function and one-touch dialing function, the user stores predetermined telephone numbers of persons to whom the user wishes to place a call in a memory of the telephone by operating the keys of the telephone set. Following such storage, the user can make an outgoing call by simply manipulating the keys of an abbreviated number or by only depressing the so-called one-touch dial key of the telephone set.

While this kind of telephone is very convenient once it is programmed, if the user buys another multi-function telephone set, or buys a different type of multi-function telephone, or if the user has to substitute another multi-function telephone set of the same type because of a malfunction of the already programmed telephone set, then the user has to manually input, one-by-one, all of the various data, which typically consists of a large number of telephone numbers for the outgoing calls that had been previously stored in the memory of the original telephone set. This re-entering of the plurality of phone numbers is very cumbersome and inconvenient for the user.

OBJECTS AND SUMMARY OF THE INVENTION

Accordingly, it is an object of the present invention to provide an improved telephone apparatus that can eliminate the above-noted defects inherent in the prior art.

It is another object of the present invention to provide a telephone apparatus including first and second handset units that can be electrically connected to each other, for example, by a cable, wherein when a predetermined key of on of the handset units is operated, data stored in a memory of the first handset unit is copied to a memory of a second handset unit without re-entering all of the data by manipulating the telephone keys of the second handset unit.

A further object of the present invention is to provide a telephone apparatus having such data transfer capability that is applicable for use with a mobile telephone system, a cordless telephone, or an intelligent telephone set.

According to one aspect of the present invention, there is provided a telephone apparatus that comprises a handset unit having a keypad and a memory for storing data, such as a plurality of telephone numbers, with the handset unit being intended to make an outgoing call on the basis of the data stored in the memory. A data transmitting section is also provided for permitting connection of two of the handset units, so that when a predetermined key of one of the two handset units is operated in a predetermined manner, the data stored in the memory of the one handset unit is transmitted to the memory of another handset through use of the respective data transmitting sections of each handset unit.

The manner in which the above and other objects, features, and advantages of the present invention are accomplished will become readily apparent from the following detailed description thereof, which is to be read in connection with the accompanying drawings.

DETAILED DESCRIPTION OF PREFERRED EMBODIMENT

In one embodiment, the present invention is advantageously applied to a so-called cordless telephone system. As is well-known, the typical cordless telephone system is comprised of a remote station formed as a so-called handset unit having transmitting and receiving sections and a master station or a so-called base unit, also having transmitting and receiving sections. The base unit is directly connected to the telephone network and the handset unit and the base unit are mutually connected by radio waves. Telephone subscribers or users can pick up and operate the handset unit in the same way as they operate a standard telephone set.

Figure 1:
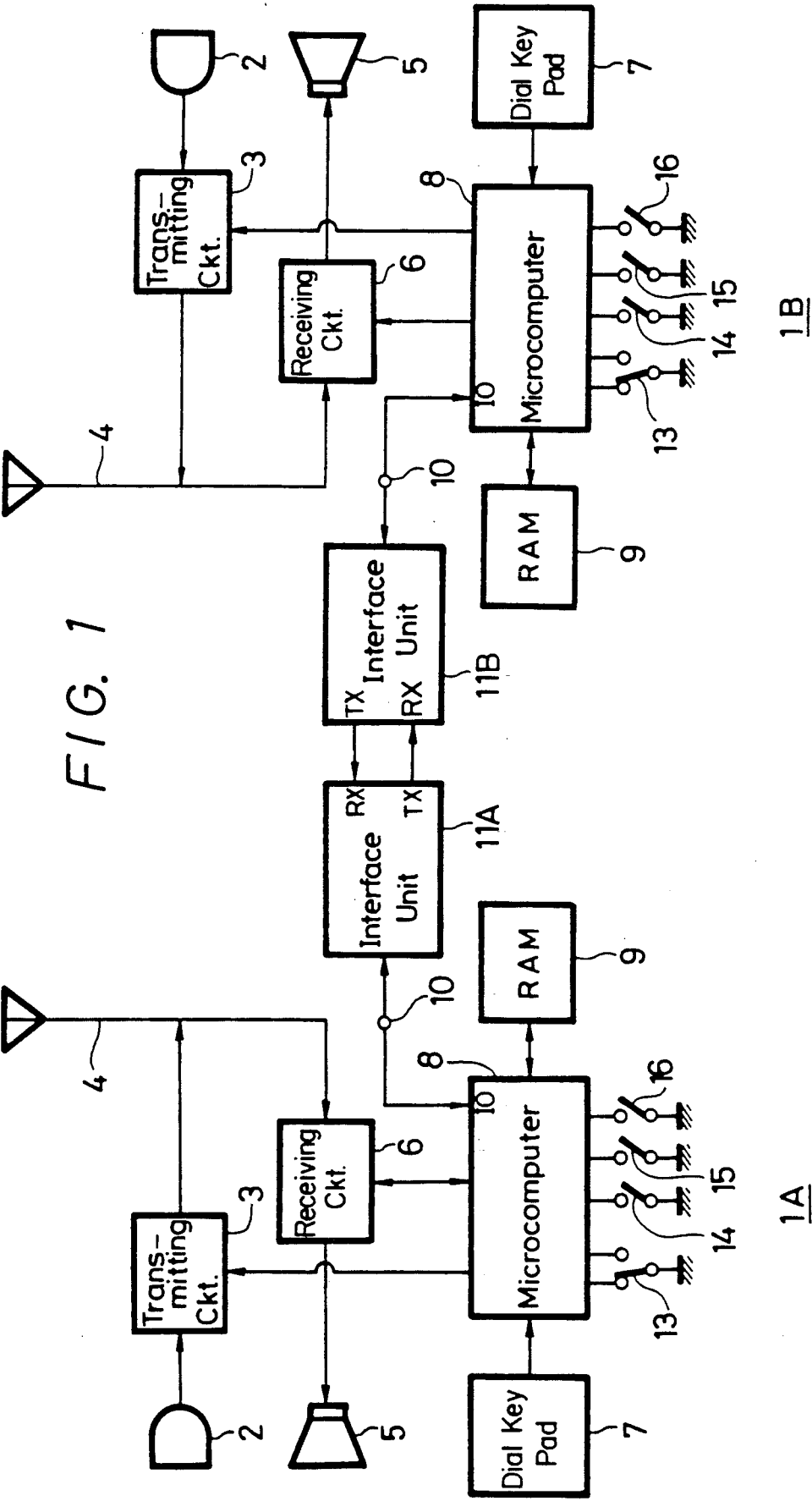
FIG. 1 is a schematic in block diagram form of a telephone system according to an embodiment of the present invention.
Figure 2:
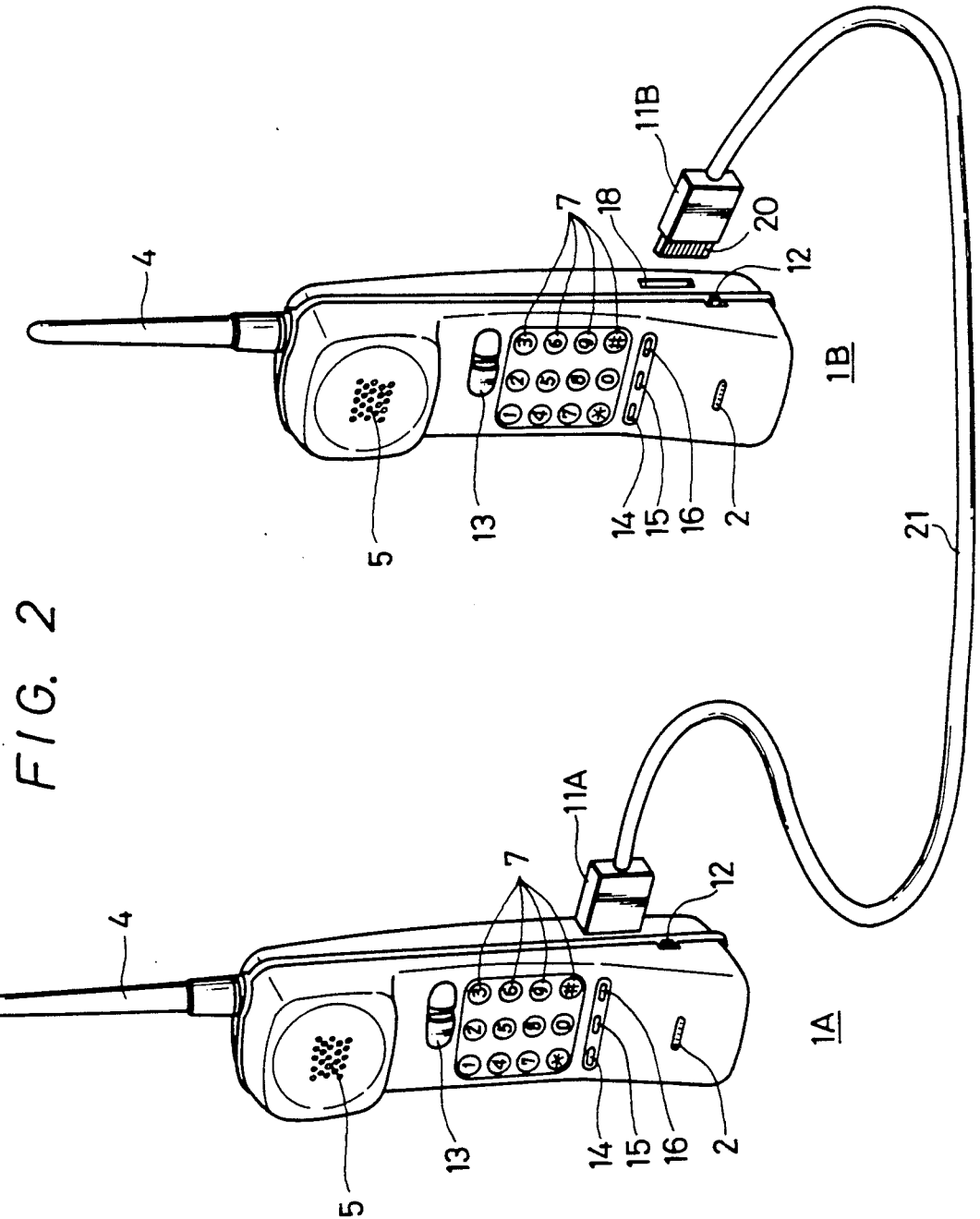
FIG. 2 is a perspective view pictorially illustrating cordless telephone receivers to which the telephone apparatus of the present invention can be advantageously applied.

An example of a circuit arrangement of a handset unit of such cordless telephone is shown in FIG. 1, and FIG. 2 pictorially illustrates two of the above-mentioned handset units, as might be included in the system of FIG. 1.

Referring to FIGS. 1 and 2, handset units 1A and 1B of the cordless telephone system are identical, so that only handset unit 1A need be explained in detail. Handset unit 1A is comprised of a microphone 2 for picking up the spoken words of a user, a transmitting circuit 3 for transmitting an audio signal corresponding to the output of microphone 2 and a control signal to another telephone station over an antenna 4, a speaker or transducer 5 for producing the words of the other party in a telephone conversation, a receiving circuit 6 for receiving the audio signal and control signal transmitted from another telephone station, a dial key pad 7, a microcomputer 8 for controlling the operation of the various subsystems of handset unit 1A, and a random access memory (RAM) 9 cooperating with microcomputer 8. Microcomputer 8 may advantageously be comprised of a commercially available product known as HD-647180X marketed by Hitachi Limited. RAM 9 is provided to store data such as different telephone numbers for outgoing calls and the like, and is backed-up by a battery (not shown) so as to become a non-volatile memory.

Microcomputer 8 is provided with a change-over switch 13 to change-over from a communication mode to a noncommunication mode. When the handset unit is not being used, change-over switch 13 is set in the noncommunication mode. Upon determining to make an outgoing call the user operates change-over switch 13 to place handset unit 1A in the communication mode. The user then makes an outgoing call by entering the appropriate telephone number for the outgoing call by depressing the corresponding keys of dial keypad 7. At the completion of the telephone conversation, the user again operates button 13 to cause the handset unit 1A to be set back into the noncommunication mode.

An incoming call is received as follows. When a ringer tone is emitted by speaker 5, the user operates change-over switch 13 to place the handset unit 1A in the communication mode, thereby making a telephone conversation possible. After the telephone communication is ended, the user again operates change-over switch 13 to cause handset unit 1A to be set back into the noncommunication mode.

Microcomputer 8 is provided with auxiliary buttons, such as a reserve switch 14, a pause switch 15, and a call switch 16. The reserve switch 14 places the line on hold and typically plays a tune or melody to the other party on hold. A power switch 12 is provided, as shown in FIG. 2, and this is the main switch for the handset unit. The above-mentioned circuit elements and switches 2 through 9 and 12 through 16 are substantially the same as those found in a standard cordless telephone and operate in the well-known fashion, so they need not be described in any further detail.

Two interface units 11A and 11B are provided and are constructed to operate according to standards set down by the Federal Communications Commission (FCC), for example, standard RS-2326. This standard specifically describes interface units that are adapted to transfer data onto the telephone network. In order to transfer data, interface units 11A and 11B are connected between the respective data terminals 10 of handset units 1A and 1B. Each data terminal 10 is provided within the respective handset units 1A and 1B at positions corresponding to jacks 18 formed in the side of handset units 1A and 1B, as shown in FIG. 2.

Referring to FIG. 2, interface units 11A and 11B each have electrical contacts 20 that form a plug to make electrical contact with the respective data terminals 10 located in the respective handset units. When the plugs are inserted in the jacks 18, contacts 20 are brought into electrical contact with the internal data terminals 10, thereby to connect interface units 11A and 11B through their respective data terminals 10. Interface units 11A and 11B are connected to each other for transmitting and receiving data by means of at least two electrical conductors located in a cable 21.

Figure 3:
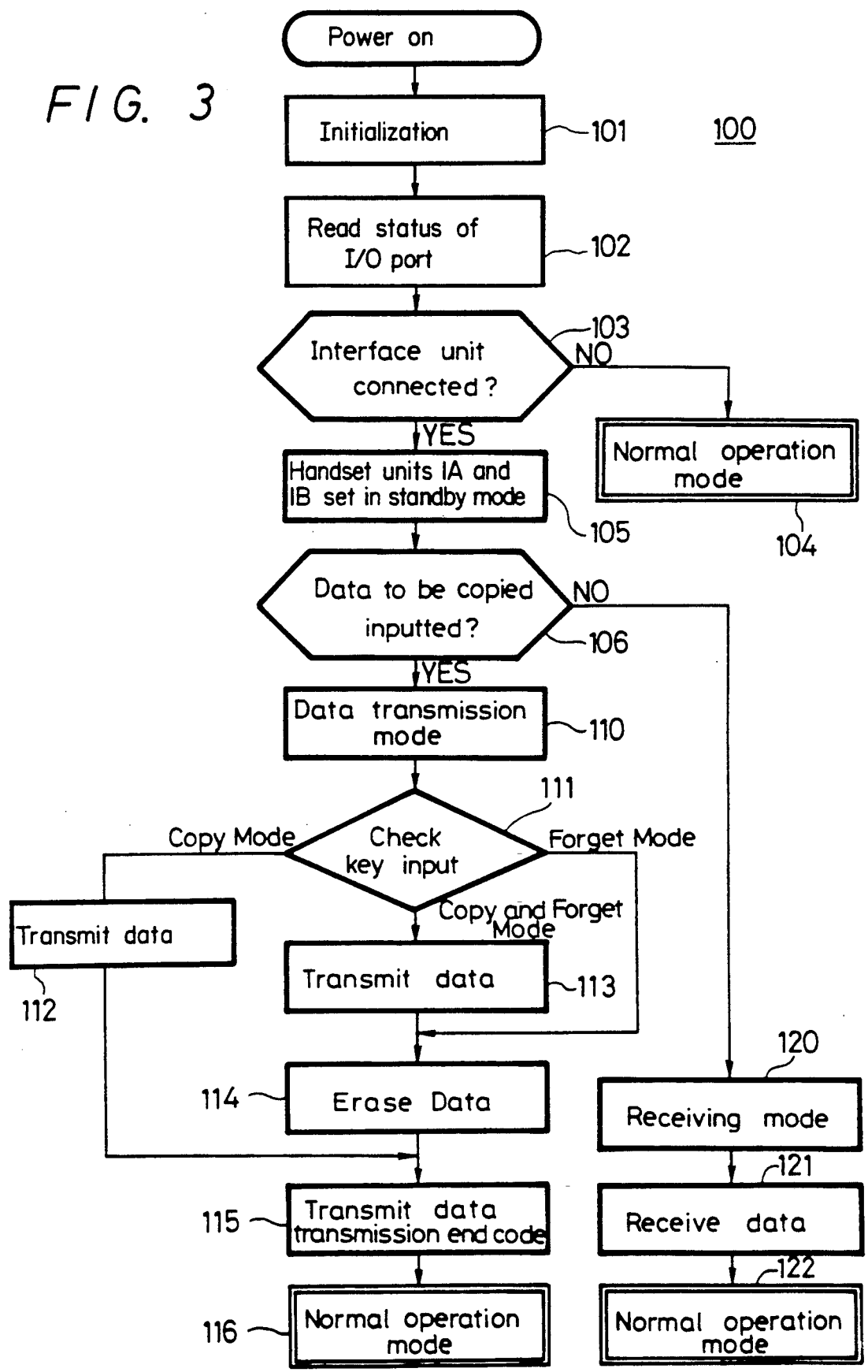
FIG. 3 is a flow chart useful in explaining the operation of the telephone system of the present invention.

In order to transfer the data between the handset units, a data transfer routine 100, shown in FIG. 3, is provided within the respective microcomputers 8 of handset units 1A and 1B. RAM 9 in handset unit 1A is provided to store therein predetermined phone numbers that the user of handset 1A wishes to call. The flow chart of FIG. 3 explains how to operate the switches and keys of handset unit 1A to transfer data, such as a plurality of phone numbers stored in RAM 9, to the corresponding RAM of handset unit 1B.

Initially, interface units 11A and 11B are connected to the respective data terminals 10 of handset unit 1A and handset unit 1B by inserting contacts 20 into jacks 18, whereby microcomputer 8 of the handset unit 1A and the microcomputer 8 of handset unit 1B are mutually connected via these interface units 11A and 11B and the wires in cable 21.

When the respective power switches 12 of handset units 1A and 1B are turned ON, the data transfer routine 100 of FIG. 3 is started in each handset unit 1A and 1B. In step 101, initialization of respective logic sections is performed in the well-known fashion, and the routine proceeds to the next step 102, in which the status of the input/output (I/O) port of microcomputer is read out. In the next decision step 103, it is determined on the basis of the of the I/O port whether an interface unit is connected to data terminal 10. If it is determined that an interface unit, such as 11A or 11B, is not connected to data terminal 10, as represented by a NO at step 103, the routine proceeds from step 103 to step 104, where handset units 1A and 1B are set in the normal operation mode for making an outgoing call and for receiving an incoming call.

In the event that step 103 determines that an interface unit 11A or 11B is indeed connected to data terminal 10, a YES decision is made and the routine proceeds from step 103 to step 105. In step 105, handset units 1A and 1B are both set in a standby mode for a predetermined time period while awaiting the instructional inputs from one of the respective key pads 7. If instructional data is input by operating a key pad 7 within the predetermined time period, then that handset unit, 1A or 1B, is designated at the transmitting unit, the above-mentioned input data is read out, and the routine proceeds to step 106. If no data is input by the key pad 7 of handset 1A or 1B, then, the routine directly proceeds to step 106. In other words, one handset unit will have data entered using its key pad within the standby period and the other handset unit will not have data entered using its key pad. For example, particular data such as [#], [7], [3], [8], [6] will be input to handset unit 1A, which will be the unit to transfer data, by operating dial key pad 7 in step 105, whereas no data will be input to handset unit 1B because it will be the unit to which the data is transferred. The so-called particular data is a identification code (ID) that is used to transfer data from one handset to another.

In the next decision step 106, the respective microcomputers 8 of handset units 1A and 1B determines whether the particular instructional data was input by operating the respective dial key pad 7 at step 105.

If it is determined that the particular data is input to handset unit 1A, as represented by a YES at step 106, then the processing by microcomputer 8 proceeds from step 106 to step 110, and handset unit 1A is set in the data transmission mode. If it is determined that the particular data was not input to handset unit 1B, as represented by a NO at step 106, then the routine proceeds from step 106 to step 120, and handset unit 1B is placed in the data reception mode.

In handset unit 1A, the routine proceeds from step 110 to the next decision step 111 where it is determined whether the data input by keypad 7 represents the copy mode or the forget mode or the copy and forget mode. If the key [1] is pressed after the key [*] in dial key pad, this represents the copy mode. If such was the case, the routine proceeds from step 111 to step 112, wherein microcomputer 8 in handset unit 1A is operated to transmit the data, such as a plurality of telephone numbers, stored in RAM 9 to data terminal 10 of handset unit 1B through the I/O port, terminal 10, and interface units 11A and 11B. After all of the previously stored data have been transmitted to data terminal 10 of handset unit 1B, then the routine proceeds to step 115, in which an end code indicative of the end of the data transmission operation is transmitted. The routine then proceeds to step 116, and the handset unit 1A is set in the normal operation mode.

If it is determined in step 111 that the data input by dial keypad 7 at step 105 indicates the copy and forget mode, which is represented by pressing key [2] after key [*] in dial keypad 7, the routine proceeds from step 111 to step 113, so that the data stored in RAM 9 of handset unit 1A is transmitted to handset unit 1B, just as in the operation of step 112. At the completion of the data transmission operation, the routine proceeds from step 113 to step 114, wherein microcomputer 8 is operated to erase all data stored in RAM 9 of handset unit 1A. The routine proceeds to the next step 115, with subsequent operation as described above.

If it is determined in step 111 that the data input by dial key pad 7 at step 105 indicates the forget mode, which is represented by key [3] being pressed after the [*] key, then the routine proceeds from step 111 directly to step 114, so that microcomputer 8 is operated to erase the data stored in RAM 9 of handset unit 1A. The routine proceeds then to the next step 115, with subsequent operations as described above.

As described above, handset unit 1B is set in the receiving mode at step 12 because the particular data was not entered during the standby mode, and data transmitted through interface unit 11B are sequentially written in RAM 9 at step 121. Once the data transmission end code is transmitted to handset unit 1B, the routine proceeds to step 122, wherein handset unit 1B is set in the normal operation mode.

According to this embodiment of the present invention as described above, information stored in the memory of a first handset unit is transferred to the memory of a second handset unit by operating the keys of the first handset unit. In this manner the data already entered in the memory of the first handset unit can be easily entered in the memory of another handset unit without manually inputting all of the data one by one. Thus, not only is the cumbersome operation for manually inputting data one by one eliminated, but also mistakes that tend to occur in the manual input operation can be avoided.

According to the above-described preferred embodiment, it is first checked whether an interface unit 11A or 11B is connected to a data terminal 10 of both handset units. Only when an interface unit 11A or 11B is connected to data terminal 10, can handset unit 1A be set in the data transfer mode. Thus, even if the data is input inadvertently by dial key pad 7 to set handset unit 1A in the forget mode, the data cannot be transmitted and the previously entered data can be protected.

In the foregoing, during the processing or after the processing at steps 112, 113, 114 and 121, the processing status can be announced to the user by a light emitting diode (LED) or an electronically emitted sound.

Having described a preferred embodiment with reference to the accompanying drawings in detail, it is to be understood that the invention is not limited to that precise embodiment and that many changes and modifications could be effected by one skilled in the art without departing from the spirit and scope of the invention, as defined in the appended claims.

What is claimed is:

1. Telephone apparatus comprising:
   a cordless handset unit having a data entry key and memory means for storing therein data including telephone numbers, said handset unit being used to make an outgoing call on the basis of the data stored in said memory means; and
   data transmitting cable means for interconnecting said handset unit with another like handset unit, wherein when a predetermined key of one of said handset units is operated the data including said telephone numbers stored in said memory means of said one of said handset units is transmitted directly to said memory means of said another like handset unit through said data transmission cable means while continuing to be stored in said memory means of said one of said handset units.

2. A telephone apparatus according to claim 1, wherein said memory means comprises a non-volatile memory.

3. A telephone apparatus according to claim 2, wherein said non-volatile memory comprises a random access memory (RAM) and a battery connected thereto.

4. A telephone apparatus according to claim 1, further comprising means for erasing said data from said memory means of said one of said handset units following transmission of said data to said another like handset unit.

5. A telephone apparatus according to claim 1, wherein said data transmitting cable means includes first and second interface means mutually connected by a cable and wherein said first interface means is connected to said one of said handset units and said second interface means is connected to said another like handset unit.

6. A telephone apparatus according to claim 1, further comprising means for detachably interconnecting said one of said handset units and said another like handset units by said data transmitting cable means.

7. A telephone apparatus according to claim 6, further comprising means for determining whether said one of said handset units and said another like handset unit are interconnected by said data transmitting cable means.

8. Telephone apparatus comprising:
   first and second cordless handset units, each having a key pad for entering a telephone number of an outgoing call and a memory for storing data including at least said telephone number of an outgoing call; and
   data transmitting cable means for selectively interconnecting said first and second handset units and for transmitting data stored in said memory of said first handset unit directly to said memory of said second handset unit upon operating preselected keys of said key pad of said first handset unit, said transmitted data continuing to be stored in said memory of said first handset unit.

9. A telephone apparatus according to claim 8, wherein said respective memories in said first and second handset units each comprises a non-volatile.

10. A telephone apparatus according to claim 8, further comprising means for erasing said data from said memory of said first handset unit following transmission of said data to said second handset unit.

11. A telephone apparatus according to claim 8, wherein said data transmitting cable means includes first and second interface means mutually connected by a cable and wherein said first interface means is connected to said first handset unit and said second interface means is connected to said second handset unit.

12. A telephone apparatus according to claim 8, further comprising means for detachably interconnecting said first handset unit and said second handset unit by said data transmitting cable means.

13. A telephone apparatus according to claim 12, further comprising means for determining whether said first handset unit and said second handset unit are interconnected by said data transmitting cable means.

* * * * *